United States Patent
Nutzel et al.

[15] 3,684,781
[45] Aug. 15, 1972

[54] ADJUSTING THE VISCOSITY OF POLYALKENAMERS

[72] Inventors: Karl Nützel, Opladen; Friedrich Haas, Koeln 80; Günter Marwede, Leverkusen, all of Germany

[73] Assignee: Farbenfabriken Bayer Aktiengesellschaft, Leverkusen, Germany

[22] Filed: April 6, 1970

[21] Appl. No.: 26,154

[30] Foreign Application Priority Data

April 15, 1969 Germany..........P 19 19 047.7

[52] U.S. Cl............260/80.78, 260/88.2 R, 260/93.1
[51] Int. Cl.........C08f 17/00, C08f 15/02, C08f 3/02
[58] Field of Search..............260/93.1, 88.2 R, 80.78

[56] References Cited

UNITED STATES PATENTS

| | | |
|---|---|---|
| 3,029,231 | 4/1962 | Amerongen..............260/87.5 |
| 3,449,310 | 6/1969 | Dall'Asta et al..........260/93.1 |
| 3,458,489 | 7/1969 | Natta et al................260/93.1 |
| 3,459,725 | 8/1969 | Natta et al................260/93.1 |
| 3,476,728 | 11/1969 | Natta et al................260/93.1 |
| 3,385,840 | 5/1968 | Natta et al. ...........260/88.2 R |
| 3,598,796 | 8/1971 | Nutzel et al...........260/88.2 R |

Primary Examiner—Joseph L. Schofer
Assistant Examiner—Richard A. Gaither
Attorney—Connolly and Hutz

[57] ABSTRACT

The molecular weight of cycloolefin polymers is adjusted by effecting the catalytic polymerization of cycloolefins in organic solvents in the presence of from 0.001 to 1 percent of an 1-olefin.

5 Claims, No Drawings

ADJUSTING THE VISCOSITY OF POLYALKENAMERS

The ring-opening polymerization of cyclo-olefins such as cyclobutene, cyclopentene, cycloheptene, cyclooctene, cyclodecene and cyclododecene is known. It is standard practice to use organometallic mixed catalysts containing compounds of tungsten, molybdenum, tantalum, niobium or titanium. It is, however, only possible to obtain a commercially workable economic process by using co-catalysts. Compounds containing a —O—O—, —OH or —SH group in the molecule, aromatic and aliphatic nitro compounds and epoxides are active as co-catalysts. Moreover, pure starting compounds of the kind required for reproducible polymerization reactions, provide polymers having undesirably high viscosities, and as a result the polymers cannot satisfactorily be processed, either in internal mixers or on roll stands, even at elevated temperatures.

The present invention relates to a process for the ring-opening polymerization of cyclo-olefins with organometallic mixed catalysts in an inert organic solvent, in which an 1-olefin is added to the cyclo-olefin in a quantity of from 0.001 to 5 percent by weight.

In the context of this invention, cyclo-olefins include in particular those containing from four to 12 carbon atoms, such as cyclobutene, cycloheptene, cyclo-octene, cyclononene, cyclodecene, cycloundecene and cyclododecene; and also substituted cycloalkenes whose substitutents are not situated on the double bonds, for example 3- and 4-methyl-cyclopentene. Cyclopentene is preferred. The cyclo-olefins may be polymerized either alone or with up to 30 percent by weight, and preferably with from 0.05 to 5 percent by weight, of a bicyclic or polycyclic olefin, such as dicyclopentadiene, norbornadiene or norbornene.

1-olefins are olefinically-unsaturated compounds containing terminal double bonds, such as ethylene, propylene, 1-butene, 1-pentene, 4-methyl-1-pentene, styrene and others. They are added to the cyclo-olefin during polymerization in quantities of from 0.0010 to 5 percent by weight, and preferably in quantities of from 0.01 to 1 percent by weight.

The viscosity of the polymers can be adjusted by the addition, according to the invention, of 1-olefins in the quantities specified without any appreciable changes in their microstructure (for example in the cis- or trans-bond content or the polymerization velocity).

For large-scale operation, the polymerization of cycloalkenes is best carried out in solvents only. To this end, polymerization is carried out by dissolving a cycloalkene, preferably cyclopentene, in an inert hydrocarbon such as hexane, cyclohexane, benzene or preferably toluene. The concentration of the cycloalkene should be from 5 to 25 percent by weight and preferably from 10 to 20 percent by weight. The 1-olefin is added to this mixture, either as such or in solution in the particular solvent. As a rule, this is followed by addition of the co-catalyst, the heavy metal compound and finally the organometallic compound. Although the order can be changed, the organometallic component is usually added last of all.

The following systems are examples of organometallic mixed catalysts suitable for use in the process:

I. a. Compounds of metals of groups IVa, Va and VIa of the periodic system, such as $TiCl_4$, $TaCl_5$, $NbCl_5$, $WCl_6$, $WOCl_4$, $WCl_4(OR)_2$, $MoCl_5$ and $W(allyl)_4$.

b. compounds of metals of groups I to IV of the periodic system, corresponding to the formula $$R^1_x R^2_y R^3_z Me$$

in which $R^1$ represents a $C_1$–$C_{24}$ hydrocarbon radical,
$R^2$ represents a halogen atom,
$R^3$ represents a hydrogen atom,
Me represents a metal atom, preferably Mg, Al or Sn
$x$, $y$, $z$ can be any number from 0 to 4 although $x + y + z$ can only have the maximum valency of the corresponding metal and y is always lower by at least one unit than the maximum valency.

Examples of co-catalyst systems of type I are $WCl_6/Al(iC_4H_9)_3$, $WOCl_4/AlCl(C_2H_5)_2$, $NbCl_5/AlCl(C_2H_5)_2$, $TaCl_5/MgC_6H_5Cl$, $WCl_6/AlH(iC_4H_9)_2$,  and $WCl_6/SnH(C_2H_5)_3$.

II. a. An organic compound including a complex compound of a metal of groups IVa–VIIa of the periodic system which in addition to the organic radical may also contain halogen or hydrogen.

b. A compound acting like a Friedel-Crafts catalyst.

Examples of co-catalyst systems of type II are $Ti(C_6H_5)_2/WCl_6$, $W(allyl)_4/BF_3$, $Li_3[W(C_6H_5)_6]/POCl_3$, $W(allyl)_4/WCl_4$, $Li_3[CR(C_6H_5)_6]/MoCl_5$, $Mn(C_4H_9)_2/WCl_6$, $Na_3[W(C_6H_5)_6]AlCl_3$ and $Mn(C_4H_9)_2/TaCl_5$.

The catalyst combinations may be used in quantities of, for example, from 0.1 to 5 percent by weight, based on monomer. The quantitative ratios in which the individual components are used may vary within wide limits, for example from $a : b = 0.1 : 5$ to $5 : 0.1$ (based on weight). The most favorable ratio must be determined beforehand for each combination.

It is preferred to operate with pure, dry reagents in a protective gas atmosphere of ultra-pure nitrogen or pure noble gas such as argon, in order to obtain reproducible results. The protective gas atmosphere is given a slight excess pressure (approximately 0.2 atms.) in order to prevent the penetration of air. Higher pressures do not have any adverse effects. Polymerization is usually carried out at a temperature of from −30° to +30° C. and preferably at a temperature of from −15° C. to +15° C.

On completion of the reaction, the catalyst is deactivated, conveniently with approximately 5 percent by weight (based on monomer) of a proton-active compound, such as formic acid or methanol.

It is advisable simultaneously to add a complex-former, which prevents the metals from remaining in the polymer after processing. Diamines such as ethylene diamine, aminoalcohols such as ethanolamine, or hydroxy acids such as tartaric acid, may be used for this purpose.

The polymers may be isolated by precipitation in three to five times the quantity of a solution of a lower alcohol, 1 percent by weight (based on alcohol) of an anti-ager such as di-tert.-butyl cresol, or β-phenyl naphthylamine being dissolved before precipitation. It is also possible, however, to remove the solvent by introduction into boiling water. In this instance it is desirable to introduce from 0.1 to 0.7 percent by weight, based on polymer, of an anti-ager together with the stopper.

The residual moisture can be removed by means of a recirculating-air oven, a belt-type dryer or a drying screw.

It is of course also possible to carry out the process as a whole in a continuous cycle.

Pure dry reagents and apparatus and a protective gas atmosphere of ultra-pure nitrogen are used in each of the following examples. The parts and percentages indicated are parts and percentages by weight.

COMPARISON EXAMPLE 1,000 parts of toluene and 200 parts of cyclopentene are introduced into a 2 liter autoclave equipped with a glandless stirrer, thermometer and ultra-pure nitrogen inlet. 1 mMol of $WCl_6$ dissolved in 20 parts of toluene is introduced at room temperature in the absence of air followed by the addition of 0.5 mMol of 2-cyclopentenyl hydroperoxide in the form of a 5 percent solution in cyclopentene. Cooling to $-10°$ C. is followed by the addition of 1.32 mMols of aluminum triisobutyl in solution in 10 parts of toluene. The external temperature is kept at from $0°$ to $-5°$ C. by external cooling. After 4 hours, polymerization is stopped by the addition of 10 parts of ethanolamine and the polymer is precipitated in 4,000 parts of methanol containing 20 parts of 4-methyl-2,5-di-tert.-butylphenol, after which it is dried in a recirculating air oven at $80°$ C.

The yield comprises 58 percent of the theoretical, while the trans-bond content is 93.2 percent. The product has a Mooney viscosity in excess of 150 ML/4.

EXAMPLES 2 to 5

Cyclopentene is polymerized and the resulting polymer is worked up as described in example 1, except that increasing quantities of 1-pentene are added before the $WCl_6$. The quantities of 1-pentene, the Mooney ML-4 values, the yields and trans-bond contents are set out in the following table.

| Example | % of 1-pentene based on cyclopentene | Mooney-value ML-4 | Yield % of the theoretical | trans-bond content % |
|---|---|---|---|---|
| 2 | 0.0394 | 49 | 76.3 | 92.8 |
| 3 | 0.0790 | 17 | 82.4 | 93.4 |
| 4 | 0.1580 | 11 | 88.2 | 93.6 |
| 5 | 1.312 | <10 | 70.2 | 92.8 |

EXAMPLES 6 to 12

Cyclopentene is polymerized and the resulting polymer is worked up as described in example 1, except that increasing quantities of 1-butene dissolved in toluene (1 percent by weight) are added before the $WCl_6$. The data set out in the following table provide some indication as to the regulating effect:

| Example | % of 1-butene based on cyclopentene | Mooney-valve ML-4 | Yield % of the theoretical | trans-bond content % |
|---|---|---|---|---|
| 6 | 0.0143 | <150 | 77 | 93.3 |
| 7 | 0.0215 | 140 | 77.8 | 92.5 |
| 8 | 0.0435 | 84 | 80.6 | 93.6 |
| 9 | 0.0537 | 79 | 87.0 | 93.5 |
| 10 | 0.0650 | 48 | 74.3 | 92.8 |
| 11 | 0.0896 | 26 | 78.5 | 93.8 |
| 12 | 0.125 | 11 | 80.5 | 93.4 |

EXAMPLE 13

200 parts of cyclopentene and 1,000 parts of toluene are introduced into the autoclave described in example 1. This is followed by the addition at room temperature of 0.068 part of 1-butene in the form of a 1 percent solution in toluene, and then by the addition of 0.16 mMol of 3,5-dichloro-1,2-dinitro-benzene dissolved in 10 parts of toluene. 1.2 mMols of $WCl_6$ dissolved in 20 parts of toluene are then added, followed by cooling to $-10°$ C. 1.8 mMols of aluminum triisobutyl dissolved in 15 parts of toluene are then added at that temperature. After 3 hours, polymerization is interrupted by the addition of 10 parts of ethanolamine, and the polymer is precipitated in 4,000 parts of methanol containing 20 parts of 4-methyl-2,5-di-tert.-butylphenol and dried in a recirculating air oven at $80°$ C. The yield comprises 73 percent of the theoretical. The product has a Mooney-viscosity of 84 and a trans-bond content of 94.1 percent.

If the same procedure is repeated in the absence of 1-butene, the yield is 72 percent and the trans-bond content is 93.8 percent. The product has a viscosity immeasurably in excess of 150 Mooney ML-4.

EXAMPLE 14

200 parts of cyclopentene and 1,000 parts of toluene are introduced into the autoclave described in example 1. 0.016 parts of 1-butene in the form of a 1 percent solution in toluene are then sprayed in, followed by the addition of 0.20 mMols of 3,5-dichloro-1,2-dinitrobenzene in the form of a 0.5 percent solution in toluene and then by the addition of 1.6 mMols of $WCl_6$ in solution in 20 parts of toluene. The product is then cooled to $-8°$ C., after which 0.72 mMols of tin triethyl hydride in 30 parts of toluene are added. The temperature is kept at $-5°$ C. by external cooling. After 3 hours, polymerization is stopped by the addition of 5 parts of tartaric acid, dissolved in methanol; 0.6 parts of 3,3'-dimethyl-5,5'-di-tert.-butyl-6,6'-dihydroxy diphenyl methane are added and the solution is introduced slowly in measured quantities into boiling water, stirred continuously in the presence of steam. The resulting moist crumbs are dried in a drying cabinet at $80°C./50$ mm Hg. The yield amounts to 79 percent, the Mooney viscosity to 80 Ml-4 and the trans-bond content to 94.2 percent. If the same procedure is repeated in the absence of 1-butene, substantially the same yields and bond contents are obtained, although the Mooney viscosity amounts to around 140.

EXAMPLE 15

50 parts of cyclopentene are introduced into a 100 ml capacity flask which can be stirred magnetically. 1 mMol of tungsten tetra-allyl and then 0.5 mMol of $BCl_3$ are added after the contents of the flask have been cooled to $-15°$ C. The temperature is kept at $-5°$ C. by external cooling. After 5 hours, the polymer is precipitated in 500 parts of methanol containing 5 parts of ethanolamine and 1 part of 2,5-di-tert.-butyl-p-cresol. The yield comprises 40 parts. The viscosity cannot be measured. The gel content amounts to 21 percent, while the trans-bond content of the soluble component amounts to 92.2 percent.

If the same procedure is repeated, and polymerization is modified by the addition of 0.009 parts of propylene, dissolved in 10 parts of toluene, a Mooney viscosity of 42 Ml-4 is obtained for a yield of 39 parts and a trans-bond content of 91.8 percent.

We claim:

1. In the process for the ring opening polymerization of cycloolefins dissolved in organic solvents in the presence of a metal-organic mixed catalyst which is
   I. a mixture of (a) a compound of a metal of groups IVa, Va and VIa of the periodic system and (b) a compound of the formula $$R^1_x R^2_y R^3_z Me$$

wherein $R^1$ is a $C_1$–$C_{24}$ hydrocarbon radical, $R^2$ is halogen, $R^3$ is hydrogen, Me is a metal of groups I to IV of the periodic system, $x$, $y$ and $z$ are each any integer from 0 to 4, $y$ has a value which is at least one less than the maximum valency of Me and the sum of $x$, $y$ and $z$ corresponds to the maximum valency of Me or
   II. a mixture of (a) an organic compound of a metal of groups IVa to VIa of the periodic system and (b) Friedel-Crafts catalyst, the improvement which comprises adding 0.001 to 1 percent by weight of 1-olefin to the cycloolefin before polymerization.

2. The process of claim 1 wherein said cycloolefin is cyclopentene.

3. The process of claim 1 wherein dicyclopentadiene, norbornadiene or norbornene is used as an additional monomer in an amount of from 0.05 to 5 percent by weight.

4. The process of claim 1 wherein said 1-olefin is ethylene, propylene, 1-butene, 1-pentene, 4-methyl-1-pentene or styrene.

5. The process of claim 1 wherein said Friedel-Crafts catalyst is $WCl_6$, $BF_3$, $WCl_4$, $MoCl_5$, $WCl_6$, or $TaCl_5$.

* * * * *